Jan. 7, 1947. B. LONG 2,413,722

METHOD OF TEMPERING GLASS SHEETS

Original Filed April 2, 1936

Inventor:
BERNARD LONG
By Alle Holecube
Attorney.

Patented Jan. 7, 1947

2,413,722

UNITED STATES PATENT OFFICE 2,413,722

METHOD OF TEMPERING GLASS SHEETS

Bernard Long, Paris, France; vested in the Alien Property Custodian

Original application April 2, 1936, Serial No. 72,411. Divided and this application September 29, 1939, Serial No. 297,183. In France April 6, 1935

2 Claims. (Cl. 49—89)

In the processes now employed for the tempering of sheets of glass where the cooling is effected by means of a blowing of air or a cooling fluid, the products obtained present defects or visible iridescent spots when the sheets are examined under an oblique incidence, and which, although slight, still are detrimental to the appearance and the commercial value of these sheets. These iridescent spots correspond to the variable effects of the birefringence of glass and are due to the insufficiently regular cooling of the surface of the glass by the blowing members.

The means put into practice up to now in order to attenuate these iridescent spots have consisted in rapidly displacing upon the surface of the glass the zones of impact of the jets of air issuing from several orifices. But the methods which have been used for this purpose have not given completely satisfactory results and iridescent spots are still found upon the tempered products, which are due to variations in the cooling action between certain zones and the adjacent zones and which correspond either to the form of the orifices or to the trajectory which has been imparted to the latter.

In this application there is disclosed a particular method and apparatus for the remedying of the above objections, other and different methods and apparatus for the same purpose being disclosed in my prior application, Serial No. 72,411, filed April 2, 136, which issued as Patent No. 2,303,749, Dec. 1, 1942, and of which this application is a division.

The invention reserved for this application, generally stated, comprehends the heating of a sheet or plate of glass to approximately its softening point and then by suitable means causing the sheet to travel between a plurality of stationary bars or boxes each provided with slits so that the glass is rapidly chilled by the travel of the glass past these slits. The sheet or plate of glass may then be brought to rest between oppositely disposed blow heads from which cooling jets issue, whereby the glass sheet may be further rapidly chilled.

Experience has shown that the sheets of tempered glass obtained by this process of cooling do not present any birefringent defects, whatever the incidence under which they are observed. Moreover, it has been established that it is sufficient to effect the beginning of the cooling of the sheet of glass by this process and that it is possible to stop after the passage of a certain number of the waves of air and to finish by the aid of known means, such as, for example, a simple blowing by grilles or plates provided with stationary openings.

The sheet 1 leaving an oven 67 passes between two series of hollow bars 68 having slits and supplied by a cooling fluid under pressure.

Figure 1:
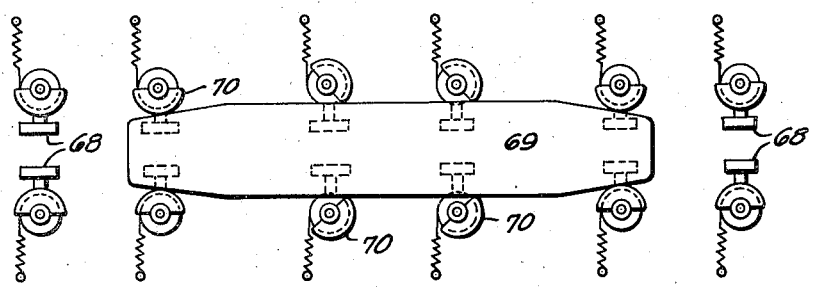
Figure 1 is a view illustrating the valve arrangement for carrying out my invention.
Figure 2:
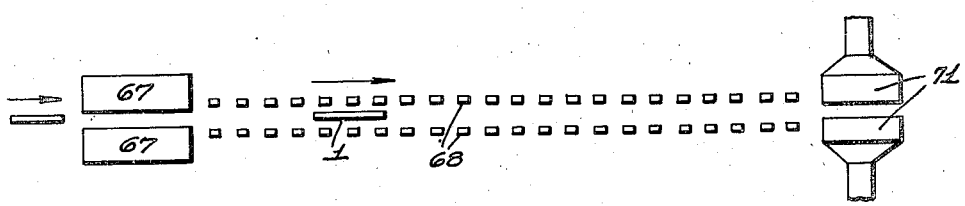
Figure 2 is a plan view illustrating the heating oven, stationary boxes for projecting the cooling air upon the sheets in the form of ribbons or bands and also the stationary cooling device.

In order to avoid unnecessary expense of the fluid it is advisable to supply only those of the bars which are in active position in relation to the sheet. For this purpose it is possible to furnish the carriage carrying the sheet with an operating plate 69, (Fig. 1), acting upon cams 70 which open or close the cocks placed upon the pipes bringing the fluid to the bars 68.

In order to attain the complete cooling of the sheet with this apparatus it is necessary to have two extended rows of bars. However, if this be objectionable it can be avoided by effecting only the beginning of the tempering by the means characterizing the invention and by finishing it by means of apparatus 71 between which the sheet remains stationary. This apparatus of known type may consist simply of fixed jets of air effected by means of holes and without movement of the latter.

What I claim is:

1. The method of tempering glass sheets or plates which consists in heating a glass plate to its softening point, and translating the plate endwise past a plurality of continuous strips or sheets of cooling fluid disposed to cross the path of travel of the glass plate.

2. The method of tempering glass sheets or plates which consists in heating a glass plate to its softening point, translating the plate endwise past a plurality of continuous strips or sheets of cooling fluid disposed to cross the path of travel of the glass plate, and thereafter bringing the plate to rest between oppositely disposed jets of cooling fluid.

BERNARD LONG.